US010099254B2

(12) United States Patent
Konishi et al.

(10) Patent No.: US 10,099,254 B2
(45) Date of Patent: Oct. 16, 2018

(54) CLASSIFICATION METHOD OF PARTICULATE WATER ABSORBENT RESIN

(75) Inventors: Kazumasa Konishi, Himeji (JP); Kenji Kadonaga, Kakogawa (JP); Yorimichi Dairoku, Setouchi (JP); Shinichi Fujino, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 930 days.

(21) Appl. No.: 12/532,909

(22) PCT Filed: Mar. 24, 2008

(86) PCT No.: PCT/JP2008/056255
§ 371 (c)(1),
(2), (4) Date: Jan. 6, 2010

(87) PCT Pub. No.: WO2008/123477
PCT Pub. Date: Oct. 16, 2008

(65) Prior Publication Data
US 2010/0101982 A1    Apr. 29, 2010

(30) Foreign Application Priority Data
Mar. 26, 2007    (JP) ................................. 2007-080052

(51) Int. Cl.
*B07B 9/00* (2006.01)
*C08J 3/12* (2006.01)

(52) U.S. Cl.
CPC ........ *B07B 9/00* (2013.01); *C08J 3/12* (2013.01); *C08J 3/122* (2013.01); *C08J 2300/00* (2013.01)

(58) Field of Classification Search
CPC ......... B07B 9/00; C08J 3/122; C08J 2300/00; C08J 3/12
USPC ........................................................ 209/3.1
See application file for complete search history.

(56) References Cited

U.S. PATENT DOCUMENTS

| | | | |
|---|---|---|---|
| 4,247,508 A * | 1/1981 | Housholder | 264/219 |
| 4,863,538 A * | 9/1989 | Deckard | 264/497 |
| 4,944,817 A * | 7/1990 | Bourell et al. | 264/497 |
| 5,017,753 A * | 5/1991 | Deckard | 264/497 |
| 5,076,869 A * | 12/1991 | Bourell et al. | 264/497 |
| 5,149,334 A | 9/1992 | Lahrman et al. | |
| 5,156,697 A * | 10/1992 | Bourell et al. | 264/497 |
| 5,180,622 A | 1/1993 | Berg et al. | |
| 5,250,640 A * | 10/1993 | Irie et al. | 526/88 |
| 5,284,695 A * | 2/1994 | Barlow et al. | 264/497 |
| 5,352,405 A * | 10/1994 | Beaman et al. | 419/45 |
| 5,419,956 A * | 5/1995 | Roe | 442/294 |
| 5,422,169 A | 6/1995 | Roe | |
| 5,505,718 A | 4/1996 | Roe et al. | |
| 5,653,346 A * | 8/1997 | Frei et al. | 209/254 |
| 5,817,206 A * | 10/1998 | McAlea et al. | 156/272.8 |
| 5,846,534 A * | 12/1998 | Waldmann et al. | 424/133.1 |
| 6,039,867 A * | 3/2000 | Frei et al. | 210/173 |
| 6,071,976 A * | 6/2000 | Dairoku et al. | 521/50 |
| 6,133,193 A * | 10/2000 | Kajikawa et al. | 502/402 |
| 7,193,006 B2 | 3/2007 | Ishizaki et al. | |
| 7,347,330 B2 | 3/2008 | Dairoku et al. | |
| 2001/0029358 A1* | 10/2001 | Beihoffer et al. | 604/368 |
| 2003/0020199 A1* | 1/2003 | Kajikawa et al. | 264/140 |
| 2004/0110006 A1* | 6/2004 | Ishizaki et al. | 428/402 |
| 2004/0197087 A1* | 10/2004 | Kim | 386/96 |
| 2004/0242761 A1* | 12/2004 | Dairoku et al. | 524/556 |
| 2006/0073969 A1 | 4/2006 | Torii et al. | |
| 2006/0204755 A1* | 9/2006 | Torii et al. | 428/402 |
| 2007/0149691 A1 | 6/2007 | Ishizaki et al. | |
| 2008/0202987 A1 | 8/2008 | Weismantel et al. | |
| 2009/0169664 A1* | 7/2009 | Cox | 425/174.4 |
| 2009/0194462 A1 | 8/2009 | Stueven et al. | |

FOREIGN PATENT DOCUMENTS

| | | |
|---|---|---|
| JP | 3015487 | 6/1995 |
| JP | 11-156299 | 6/1999 |
| WO | WO 97/29148 | 8/1997 |
| WO | WO 2008/037675 | 4/2008 |

OTHER PUBLICATIONS

International Search Report for PCT/JP2008/056255 dated Jun. 10, 2008.
Written Opinion for PCT/JP2008/056255 dated Jun. 10, 2008.
English-language Search Report dated Jul. 30, 2013 in European Application No. 08739372.4.

* cited by examiner

*Primary Examiner* — Minh Truong
*Assistant Examiner* — Michael E Butler
(74) *Attorney, Agent, or Firm* — Nixon & Vanderhye, PC

(57) ABSTRACT

A particulate water absorbent resin is obtained by polymerizing an unsaturated monomer so as to form a cross-linked polymer hydrogel and drying and pulverizing the cross-linked polymer hydrogel, and plural classification steps different from each other are carried out so as to remove fine powder. In this manner, the present invention provides the method for classification of particulate water absorbent resin which method allows particulate water absorbent resin having a desired particle diameter range to be efficiently obtained at low cost while securing the high productivity even in case where a larger production equipment is used.

6 Claims, No Drawings

CLASSIFICATION METHOD OF PARTICULATE WATER ABSORBENT RESIN

This application is the U.S. national phase of International Application No. PCT/JP2008/056255 filed 24 Mar. 2008 which designated the U.S. and claims priority to Japanese Patent Application No. 2007-080052 filed 26 Mar. 2007, the entire contents of each of which are hereby incorporated by reference.

TECHNICAL FIELD

The present invention relates to a method for classification of particulate water absorbent resin. In more detail, the present invention relates to a method for classification of particulate water absorbent resin which method allows particulate water absorbent resin having a desired particle diameter range to be efficiently obtained at low cost while securing high productivity.

BACKGROUND ART

A water absorbent resin is widely used for various purposes, e.g., sanitary materials such as disposable diapers, sanitary napkins, adult incontinence pads, and soil water retaining agents or similar agents, and a great amount of water absorbent resins are produced and consumed. Recently, particularly in the sanitary material purposes such as the disposable diapers, the sanitary napkins, the adult incontinence pads, and the like, there is such tendency that an amount of water absorbent resin is increased and an amount of pulp fiber is decreased to make the product thinner. Thus, the water absorbent resin is required to have a greater absorbency against pressure. While, due to a larger amount of water absorbent resin for each sanitary article, the cost of the water absorbent resin is required to be lower.

Generally, the water absorbent resin is formed by drying and pulverizing a polymer hydrogel, obtained by carrying out aqueous solution polymerization with respect to an unsaturated monomer, into a powdery form. The polymer hydrogel is obtained as a clump or an agglomerate of hydrogel particles. Generally, the polymer hydrogel is roughly crushed by a crusher such as a kneader, a meat chopper, and the like. Further, the roughly crushed hydrogel is dried so that its solid content is 95 weight %, and then the dried hydrogel is pulverized by a pulverizer so as to have a particle diameter corresponding to the purpose or use. Particularly, in case of making a sanitary material for a disposable diaper thinner, it is necessary to use a water absorbent resin having both capillary absorbency and liquid permeability in order to maximize the performance of the absorbent core. Thus, it is known that it is important to control a particle diameter distribution represented by a logarithmic standard deviation within a specific range by setting a mass average particle diameter of the particulate water absorbent resin to be 234 to 394 μm (see Japanese Unexamined Patent Publication No. 261797/2004 (Tokukai 2004-261797)).

However, in the pulverization step after the drying, not only particles whose particle diameter is within the desired particle diameter range but also particles whose particle diameter deviates from the desired particle diameter range occur. For example, if so-called fine powder such as fine particles whose particle diameter is smaller than 150 μm or ultra-fine particles whose particle diameter is smaller than 106 μm is included in the particulate water absorbent resin, this results in lower performance such as lower liquid permeability of the particulate water absorbent resin and lower absorbency against pressure. In this way, inclusion of the fine powder is not preferable. However, the pulverization that causes the mass average particle diameter to be substantially the same as the particle diameter range of the fine particles may increase also an amount of fine particles whose particle diameter is not more than 150 μm. Thus, it is necessary to remove the fine powder, whose amount is relatively large, through classification.

Thus, particles of the pulverized particulate water absorbent resin are sieved with a classifier so as to obtain particles having the aforementioned mass average particle diameter and the aforementioned particle diameter distribution for example. Examples of general classification include: classification using a screen and gravity (classification by sieving); classification using an aerial current and buoyancy (classification by wind force); and the like. In classification of fine particles whose particle diameter is not more than 300 μm for example, the classification by wind force is generally regarded as being suitable (Patent Document 1).

Generally, in order to prevent drop of the yield, fine powder removed by the classification is reformed into larger particles through granulation or the like and then the particles are collected into a production line.

[Patent Document 1]
Japanese Unexamined Patent Publication No. 156299/1999 (Tokukaihei 11-156299)(Publication date: Jun. 15, 1999)

DISCLOSURE OF INVENTION

Recently, a production equipment of a water absorbent resin has been larger and has been required to continuously produce water absorbent resins due to greater demand and tendency to reduce the cost. With this tendency, it has become necessary to continuously classify a large amount of water absorbent resin particles. However, it was found that mere application of the conventional classification raises the following problems.

In the classification by wind force, an extremely large device for classifying a large amount of particles is required, which results in the higher cost. While, in the classification by sieving, the device is smaller than the device used in the classification by wind force, but classification of small particles cannot be efficiently carried out. Thus, a larger device in this case raises a problem.

For example, in case of classifying fine powder whose particle diameter is less than 150 μm with a circular sieve at the time of small-amount production, the fine powder is sieved with a screen whose mesh size is 150 μm taking long time or the fine powder is efficiently sieved with a screen whose mesh size is slightly larger than 150 μm taking short time. However, if a larger sieving device having a circular screen is used at the time of large-amount production, the number of peripheral fixing points decreases relative to a mesh area, which results in less strength, insufficient strength (wire diameter) of the screen relative to a throughput, susceptibility to tapping balls for preventing clogging of the screen, and a similar disadvantage, so that the screen is broken in short time. As a result, there occurs such problem that metal foreign substances deriving from the screen are incorporated into the production line.

If a retention period of particles on the screen is reduced, a weight of the particles on the screen decreases, so that the screen is less likely to be broken. However, according to this method, fine powder is not completely sieved out from the particles on the screen, so that a large amount of the fine powder remains on the screen. This raises such problem that the performance of the particulate water absorbent resin drops as a product.

In order to solve the foregoing problems, classification using a screen whose mesh size is 180 μm is applicable for example. As a result, the wire diameter is large, so that the strength of the screen is improved, and sieving efficiency is improved. This makes it possible to reduce the retention period of particles on the screen. However, according to this method, a relatively large amount of particles whose particle diameter is not less than 150 μm which particles do not have to be removed are included in fine powder having passed through the screen. This results in such problem that a collect rate of the fine powder so increases that the cost becomes high. Further, there occurs such problem that the performance of the particulate water absorbent resin significantly drops as a product depending on the fine powder collection method.

In view of the foregoing conventional problems, the present invention was made, and an object of the present invention is to provide a classification method of particulate water absorbent resin which method allows particulate water absorbent resin having a desired particle diameter range to be efficiently obtained at low cost while securing the high productivity even in case where a larger production equipment is used.

In order to solve the foregoing problems, a method of the present invention for classification of particulate water absorbent resin obtained by polymerizing an unsaturated monomer so as to form a cross-linked polymer hydrogel and drying and pulverizing the cross-linked polymer hydrogel, said method comprising plural classification steps different from each other so as to remove fine powder.

According to the invention, the plural classification steps different from each other are carried out so as to remove fine powder, so that particulate water absorbent resin classified by a classification step is further classified by another classification step, and an amount of the particulate water absorbent resin to be classified by further classification steps becomes smaller. As a result, even in case where a larger production equipment is used, smaller production equipments can be used so as to correspond to the further classification steps. As a result, the method of the present invention for classification of particulate water absorbent resin realizes lower cost throughout the plural classification steps. Further, in case of using a larger production equipment, the method of the present invention for classification of particulate water absorbent resin realizes higher productivity.

Further, it is preferable to arrange the method of the present invention for classification of particulate water absorbent resin so that the plural classification steps include: a first classification step in which a first screen and a gravity are used; and a second classification step in which a second screen and an aerial current are used, and particulate water absorbent resin having been classified by the first classification step and having passed through the first screen is further classified by the second classification step so as to remove fine powder.

According to the invention, the particulate water absorbent resin having been classified by the first classification step and having passed through the first screen is further classified by the second classification step so as to remove fine powder, so that an amount of particulate water absorbent resin to be classified in the second classification step is smaller than that in the first classification step. Thus, even in case where a larger production equipment is used, the amount of particulate water absorbent resin to be classified may be small in the second classification step. As a result, it is not necessary to use a larger production equipment in the second classification step, so that the method of the present invention for classification of particulate water absorbent resin realizes lower cost throughout the first and second classification steps. Further, a larger production equipment is used in the first classification step, so that the method of the present invention for classification of particulate water absorbent resin realizes high productivity throughout the classification steps.

Further, it is preferable to arrange the method of the present invention for classification of particulate water absorbent resin so that the plural classification steps are applied to a line for continuously producing particulate water absorbent resin so that a production amount is 500 kg/hr or more for each line.

As a size of a production equipment is larger, the conventional classification raises more significant problem. Thus, in case where the larger production equipment is used, the method of the present invention for classification of particulate water absorbent resin exhibits greater effect.

Further, it is preferable to arrange the method of the present invention for classification of particulate water absorbent resin so that a pneumatic classifier having the second screen is used in the second classification step.

Thus, the method of the present invention for classification of particulate water absorbent resin allows classification using the screen and an aerial current to be carried out without fail.

Further, it is preferable to arrange the method of the present invention for classification of particulate water absorbent resin so that a mesh size of the first screen is 150 μm or more and 300 μm or less. Further, it is preferable to arrange the method of the present invention for classification of particulate water absorbent resin so that a mesh size of the second screen is 106 μm or more and 180 μm or less.

Thus, the method of the present invention for classification of particulate water absorbent resin allows particulate water absorbent resin having a desired particle diameter range to be efficiently obtained.

Further, it is preferable to arrange the method of the present invention for classification of particulate water absorbent resin so that a difference between the mesh size of the first screen and the mesh size of the second screen is 30 μm or more and 200 μm or less.

Thus, the method of the present invention for classification of particulate water absorbent resin allows particulate water absorbent resin whose particle diameter distribution is narrow to be obtained.

Further, it is preferable to arrange the method of the present invention for classification of particulate water absorbent resin so that particles whose particle diameter is less than 180 μm are classified from the particulate water absorbent resin in the first classification step, and particles whose particle diameter is 106 μm or more are classified from the particles whose particle diameter is less than 180 μm in the second classification step.

Thus, the first screen whose mesh size is 180 μm can be used in the first classification step. As a result, the first screen is free from any clogging, so that the method of the present invention for classification of particulate water absorbent resin realizes more efficient classification. Further, the second screen whose mesh size is 106 μm can be used in the subsequent second classification step. As a result, the method of the present invention for classification of particulate water absorbent resin allows ultra-fine particles whose particle diameter is smaller than 106 μm to be classified. Thus, the method of the present invention for classification of particulate water absorbent resin decreases a collect rate of ultra-fine particles, thereby securing high productivity.

Further, it is preferable to arrange the method of the present invention for classification of particulate water absorbent resin so that particles whose particle diameter is less than 180 μm are classified from the particulate water absorbent resin in the first classification step, and particles whose particle diameter is 150 μm or more are classified from the particles whose particle diameter is less than 180 μm in the second classification step.

Thus, the second screen whose mesh size is 150 μm can be used in the second classification step. As a result, the method of the present invention for classification of particulate water absorbent resin allows fine particles whose particle diameter is smaller than 150 μm to be classified. Thus, the method of the present invention for classification of particulate water absorbent resin decreases a collect rate of fine particles, thereby securing high productivity.

Further, it is preferable to arrange the method of the present invention for classification of particulate water absorbent resin so that, in the first classification step, a differential pressure equal to or more than 10 mm $H_2O$ is provided between an area where the particulate water absorbent resin has not passed through the screen and an area where the particulate water absorbent resin has passed through the screen so as to remove fine powder.

According to the method of the present invention for classification of particulate water absorbent resin, the differential pressure equal to or more than 10 mm $H_2O$ allows fine powder to be removed without fail.

For a fuller understanding of the nature and advantages of the invention, reference should be made to the ensuing detailed description taken in conjunction with the accompanying drawings.

BEST MODE FOR CARRYING OUT THE INVENTION

One embodiment of the present invention is described below. However, the scope of the present invention is not limited to the embodiment, but may be altered by a skilled person within the scope of the claims. Note that, in the present specification, "mass" is a synonymous of "weight". Further, "particle size" is synonymous of "particle diameter".

A method according to the present invention for classification of particulate water absorbent resin obtained by polymerizing an unsaturated monomer so as to form a cross-linked polymer hydrogel and drying and pulverizing the cross-linked polymer hydrogel, said method comprising plural classification steps different from each other so as to remove fine powder. Further, it is preferable to arrange the method of the present invention for classification of particulate water absorbent resin so that the plural classification steps include: a first classification step in which a first screen and a gravity are used; and a second classification step in which a second screen and an aerial current are used, and particulate water absorbent resin having been classified by the first classification step and having passed through the first screen is further classified by the second classification step so as to remove fine powder. Note that, it is preferable to continuously carry out the first classification step and the second classification step, but also a step of treating the particulate water absorbent resin may be included between the first classification step and the second classification step as the present invention as long as the particle diameter of the particulate water absorbent resin having been classified does not vary.

(I) Particulate Water Absorbent Resin

<Particulate>

The particulate water absorbent resin obtained by the method of the present invention for classification of particulate water absorbent resin is a water absorbent resin which is particulate. Herein, examples of a "particulate" shape include a spherical shape, a rod-like shape, an ellipsoidal shape, or a granular shape made of spherical or ellipsoidal particles, and a similar shape. Further, examples of the particulate shape include: an irregularly-pulverized shape obtained by pulverizing a polymer hydrogel prepared by polymerizing monomer aqueous solution; and a granular shape thereof. Preferred is the spherical shape or the ellipsoidal shape is preferable, and more preferred is the granular shape of the spherical or ellipsoidal particles or the irregularly-pulverized shape obtained by pulverizing the polymer hydrogel prepared by polymerizing monomer aqueous solution or the granular shape thereof. The irregularly-pulverized shape or the granular shape thereof is particularly preferable.

<Water absorbent resin>

As the particulate water absorbent resin of the present invention, there is used a water absorbent resin obtained by cross-linking and polymerizing an unsaturated monomer containing acid group and/or its salt (any water absorbent resin may be used as long as the water absorbent resin has a cross-linked structure, and it is possible to use a water absorbent resin obtained through a cross-linking reaction based on a cross-linking agent or self cross-linking at the time of polymerization after polymerizing the unsaturated monomer containing acid group and/or its salt) and then making the water absorbent resin particulate.

The water absorbent resin of the present invention means a water swelling and water insoluble cross-linked polymer capable of forming hydrogel. The "water swelling" property means to absorb a high amount of water such as not smaller than 5 times, preferably 50 to 1000 times, in ion exchanged water. The "water insoluble" means that an extractable content (extractable polymer content) of uncross-linked portion of the water absorbent resin toward water is not higher than 50 weight % (lower limit is 0%), preferably not higher than 25 weight %, more preferably not higher than 20 weight %, particularly preferably not higher than 15 weight %, and most preferably not higher than 10 weight %.

Further, the cross-linked polymer is a polymer obtained by polymerizing an unsaturated monomer and internally having a cross-linked structure (hereinafter, referred to as "internal cross-linked structure") in order to realize favorable absorbent property. Further, the water absorbent resin may be subjected to a surface cross-linking treatment for forming a cross-linked structure in the vicinity of a surface of the water absorbent resin and may be free from any surface cross-linking treatment. In order to realize excellent absorbent property, it is preferable to carry out the surface cross-linking treatment.

Examples of the water absorbent resin made of the cross-linked polymer include one kind of or two or more kinds of: a partially neutralized polyacrylic acid polymer; a hydrolyzed starch-acrylonitril graft polymer; a neutralized starch-acrylic acid graft polymer; a cross-linked carboxymethyl cellulose; a saponified vinyl acetate-acrylic ester copolymer; a hydrolyzed or cross-linked acrylnitryl copolymer or acrylamide copolymer; a denatured cross-linked polyvinyl alcohol containing carboxyl group; a cross-linked cationic monomer; a cross-linked polymer of 2-acrylamide-2-methylpropanesulfonic acid and acrylic acid; a cross-linked isobutylene-maleic (anhydride) copolymer; and the like. Above all, the water absorbent resin is preferably a water-absorbent resin including a partially neutralized polyacrylic acid polymer obtained by polymerizing and cross-linking an unsaturated monomer including acrylic acid and/or its salt (neutralized polymer) as a main component.

The water absorbent resin made of the cross-linked polymer is obtained by polymerizing and cross-linking an unsaturated monomer and is subjected to the surface cross-linking treatment as necessary. The following will explain an unsaturated monomer, a cross-linking monomer (internal cross-linking agent), a polymerization initiator, all of which are used to produce the water absorbent resin, and a production method of the water absorbent resin.

<Unsaturated Monomer>

Any unsaturated monomer can be used as the unsaturated monomer used in the method of the present invention for classification of particulate water absorbent resin as long as it is possible to obtain a desired cross-linked polymer.

For example, in case where the cross-linked polymer is a partially neutralized polyacrylic acid polymer, an acrylic acid and/or its salt (neutralized polymer) component is used as the unsaturated monomer, and an unsaturated monomer other than the acrylic acid and/or its salt may be used as a copolymer component as well as the acrylic acid and/or its salt. This makes it possible to give not only the absorbent property but also properties such as antibacterial and deodorant properties etc. to the resultant water absorbent resin and to obtain the water absorbent resin at lower cost.

Examples of the unsaturated monomer include water-soluble or water-insoluble unsaturated monomers such as: acid group monomers such as β-acryloyl oxypropionic acid, methacrylic acid, maleic acid (anhydride), fumaric acid, crotonic acid, itaconic acid, vinyl sulfonic acid, 2-(meth)acrylamide-2-methylpropane sulfonic acid, and (meth)acryloxyalkane sulfonic acid; alkali metal salt, ammonium salt, and alkylamine salt thereof; N-vinyl-2-pyrrolidone, N-vinylacetamide, (meth)acrylamide, N-isopropyl(meth)acrylamide, N,N-dimethyl(meth)acrylamide, 2-hydroxyethyl(meth)acrylate, methoxypolyethyleneglycol(meth)acrylate, polyethyleneglycol(meth)acrylate, isobutylene, and lauryl (meth)acrylate; and the like. These unsaturated monomers may be used independently or in a suitable combination of two or more kinds. As the unsaturated monomer of the present invention, also a monomer containing the aforementioned unsaturated monomer as a copolymerization component is included.

Note that, in case of using an unsaturated monomer containing acid group as an unsaturated monomer other than the aforementioned unsaturated monomer, an alkali metal salt, an alkali earth metal salt, or an ammonium salt, preferably the alkali metal salt, is used as a salt of the unsaturated monomer. Above all, in view of the performance of the resultant water absorbent resin, the industrial easiness to obtain the salt of the unsaturated monomer, the safety, and the like, it is preferable to essentially use at least sodium salt or potassium salt.

In case of using the unsaturated monomer other than the acrylic acid (salt) together, there is used preferably 0 to 30 mol %, more preferably 0 to 10 mol %, still more preferably 0 to 5 mol % of the unsaturated monomer, with respect to a total number of moles of all the unsaturated monomers used to obtain the water absorbent resin. In other words, with respect to a total number of moles of all the unsaturated monomers used to obtain the water absorbent resin, the number of moles of the acrylic acid and its salt serving as a main component is preferably 70 to 100 mol %, more preferably 90 to 100 mol %, still more preferably 95 to 100 mol %.

Further, in view of the property and pH, it is preferable that the unsaturated monomer containing acid group such as acrylic acid is substantially neutral, and it is preferable that the acid group is neutralized. A neutralization ratio of the acid group (mol % of the neutralized acid group with respect to all the acid groups) is generally 20 to 100 mol %, preferably 30 to 95 mol %, more preferably 40 to 80 mol %. The neutralization of the acid group may be carried out with a monomer or may be carried out with a polymer or may be carried out with a combination thereof.

<Cross-linked Monomer (Internal Cross-linking Agent)>

The particulate water absorbent resin used in the method of the present invention for classification of particulate water absorbent resin is a cross-liked polymer having an internal cross-linked structure. Herein, it can be considered that the water absorbent resin has the internal cross-linked structure as long as the water absorbent resin has the water-insolubility and the water-swelling property. Thus, the internal cross-linked structure of the water absorbent resin may be obtained by self cross-linking of the unsaturated monomer without using any cross-linking unsaturated monomer serving as the internal cross-linking agent. However, it is preferable that the internal cross-linked structure is obtained by copolymerizing or reacting the unsaturated monomer and the cross-linking monomer. Herein, the cross-linking monomer serving as the internal cross-linking agent is a monomer having two or more polymerizable unsaturated groups or two or more reactive groups in its single molecule.

Examples of the internal cross-linking agent include N,N'-methylene bis(meth)acrylamide, (poly)ethylene glycol di(meth)acrylate, (poly) propylene glycol di(meth)acrylate, trimethylolpropane tri(meth)acrylate, glycerin tri(meth)acrylate, glycerin acrylate methacrylate, ethylene oxide denatured trimethylolpropane tri(meth)acrylate, pentaerythritol hexa(meth)acrylate, triallyl cyanurate, triallyl isocyanurate, triallyl phosphate, triallyl amine, poly(meth)allyloxyalkane, (poly) ethylene glycol diglycidyl ether, glycerol diglycidyl ether, ethylene glycol, polyethylene glycol, propylene glycol, glycerine, pentaerythritol, ethylenediamine, ethylenecarbonate, propylenecarbonate, polyethylene imine, and glycidyl(meth)acrylate.

These internal cross-linking agents may be used separately, or two or more of them may be appropriately used in combination. Further, the internal cross-linking agent may be added to a reaction system at one time or in installments. In case of using at least one kind of internal cross-linking agent or two or more kinds of internal cross-linking agents, it is preferable that a compound having two or more polymerizable unsaturated groups be necessarily used at the time of polymerization in view of the absorbent property, etc. of the resultant particulate water absorbent resin.

In view of a favorable property of the water absorbent resin, an amount of the internal cross-linking agent to be used is in a range preferably from 0.001 mol % to 2 mol % with respect to a total number of moles of the unsaturated monomer (except the cross-linking agent) used to obtain the water absorbent resin, more preferably from 0.005 mol % to 0.5 mol %, further preferably from 0.01 mol % to 0.2 mol %, particularly preferably from 0.03 mol % to 0.15 mol %. When the amount of the internal cross-linking agent to be used is smaller than 0.001 mol %, and when the amount of the internal cross-linking agent to be used is larger than 2 mol %, it may be impossible to obtain a sufficient absorbent property.

When introducing the cross-linked structure into a polymer by using the internal cross-linking agent, the internal cross-linking agent may be added to the reaction system before the polymerization of the monomer, during the polymerization, after the polymerization, or after the neutralization.

<Polymerization Initiator>

In polymerizing the unsaturated monomer used to obtain the particulate water absorbent resin used in the method of the present invention for classification of particulate water absorbent resin, a polymerization initiator is used. Examples thereof include: a radical polymerization initiator, such as potassium persulfate, ammonium persulfate, sodium persulfate, potassium peracetate, sodium peracetate, potassium percarbonate, sodium percarbonate, t-butyl hydroperoxide, hydrogen peroxide, 2,2'-azobis (2-amidino propane) dihydrochloride; and a photo polymerization initiator, such as 2-hydroxy-2-methyl-1-phenyl-propane-1-one.

In view of the physical property, the amount of the polymerization initiator to be used is preferably from 0.001 mol % to 2 mol %, more preferably 0.01 mol % to 0.1 mol %, with respect to a total number of moles of the entire unsaturated monomer used to obtain the water absorbent resin. It is not preferable that the amount of the polymerization initiator is less than 0.001 mol % since a larger amount of an unreacted unsaturated monomer remains. On the other hand, it is not preferable that the amount of the polymerization initiator is larger than 2 mol % since it is difficult to control the polymerization.

<Polymerization Method>

For the polymerization of the monomer (unsaturated monomer, other unsaturated monomer, cross-linking monomer, and the like) to obtain the particulate water absorbent resin used in the present invention, aqueous solution polymerization, reversed suspension polymerization, bulk polymerization, precipitation polymerization, or the like may be performed. However, in consideration of the performance of the resultant water absorbent resin, controllability of polymerization, and absorbent property of a swelling gel, preferable methods of polymerization are aqueous polymerization and reversed suspension polymerization, using an aqueous solution of the monomer.

When an aqueous solution of the monomer is used, the concentration of the monomer in the aqueous solution (hereinafter, "monomer aqueous solution") is determined in accordance with a temperature of the solution and a type of the monomer and hence is not limited to any particular value. However, the concentration is generally within 10 to 80 weight %, preferably 10 to 70 weight %, more preferably 20 to 60 weight %. Further, in carrying out the aqueous solution polymerization, a solvent other than water may be used together as necessary, and a type of the solvent used together is not particularly limited.

The polymerization of the monomer is initiated by using the aforementioned polymerization initiator discussed above. Besides the polymerization initiator, an activating energy ray, such as ultraviolet light, an electron ray, and a γ ray, may be used solely or in combination with the polymerization initiator. Note that, which temperature the polymerization is initiated is selected as required depending on which kind of polymerization initiator is used. However, it is preferable that the polymerization is initiated at a temperature in a range of 15° C. to 130° C., and it is more preferable that the polymerization is initiated at a temperature in a range of 20° C. to 120° C. It is not preferable that the polymerization is initiated at a temperature out of the ranges. If the polymerization is initiated at temperature out of the ranges, there is a possibility that an amount of a residual monomer is increased or self cross-linkage excessively takes place thereby causing the water absorbent resin to have a low absorbent property.

Note that, the reversed phase suspension polymerization is a polymerization method that is carried out by suspending the monomer aqueous solution in a hydrophobic organic solvent. For example, the reversed phase suspension polymerization is described in documents such as U.S. Pat. Nos. 4,093,776, 4,367,323, 4,446,261, 4,683,274, and 5,244,735.

While, the aqueous solution polymerization is a polymerization method in which the polymerization is carried out by using the monomer aqueous solution without using a dispersion solvent. For example, the aqueous solution polymerization is described in documents such as U.S. Pat. Nos. 4,625,001, 4,873,299, 4,286,082, 4,973,632, 4,985,518, 5,124,416, 5,250,640, 5,264,495, 5,145,906, and 5,380,808, and documents such as European Patents No. 0,811,636, No. 0,955,086, and No. 0,922,717. The monomers and initiators used in the polymerization methods described in those patent publications may be used in the present invention.

<Drying>

In general, the polymer obtained by polymerizing a monomer in accordance with the foregoing polymerization method is a cross-linked polymer hydrogel. If necessary, the cross-linked polymer hydrogel is dried and pulverized.

Further, various drying methods that can be adopted here are drying by heating, hot air drying, drying under reduced pressure, infrared drying, microwave drying, drying by azeotropy with a hydrophobic organic solvent, high humidity drying in which a high temperature steam is used, and the like drying methods, attaining the target moisture content. In this manner, the drying is not particularly limited. In case where a hot-air drying is adopted in the drying, the hot-air drying is carried out usually with hot air whose temperature is generally in a range of 60° C. to 250° C., preferably in a range of 100° C. to 220° C., and more preferably in a range of 120° C. to 200° C. How long the drying is carried out (drying time) depends on how much surface area and moisture content the polymer has and which type of a dryer is used, so that the drying time is so set, as required, that the polymer will have a target moisture content after drying, for example, the drying time is set to be within a range from one minute to 5 hours as required.

The moisture content of the water absorbent resin that can be obtained by the drying is preferably 1 to 15 weight %, more preferably 1 to 9 weight % (as the term is used herein, the "moisture content" is defined by the amount of water contained in the water absorbent resin as measured by the proportion of the lost weight after drying in the mass of the water absorbent resin before drying when the water absorbent resin is dried for 3 hours at 180° C.). However, a high moisture content results in low flowability, so that a trouble occurs in production and the water absorbent resin cannot be pulverized. As a result, it may be impossible to control the particle diameter distribution within a specific range.

Note that, in case where the polymerization is carried out by the reversed phase suspension polymerization, the cross-linked polymer hydrogel obtained after polymerization reaction may be dried as follows. That is, the cross-linked polymer hydrogel is dispersed in an organic solvent of a hydrocarbon such as hexane and the like, and azeotropically dried so that the cross-linked polymer hydrogel has a moisture content of 40 weight % or less (lower limit is 0 weight %, preferably 5 weight %), preferably 30 weight % or less. After that, the cross-linked polymer hydrogel is separated by decantation or volatilization, and the water absorbent resin separated from the organic solvent may be further dried as required.

<Pulverization>

The particulate or powdery dried agglomerate obtained in the aforementioned method is pulverized by a pulverizer. By the pulverization, the particulate water absorbent resin is obtained. The pulverizer is not particularly limited, but for example, a rolling pulverizer such as a roll mill, a hammering pulverizer such as a hammer mill, an impact pulverizer, a cutter mill, turbo grinder, a ball mill, a flash mill, and the like may be used. Above all, the roll mill is preferable in controlling the particle diameter distribution. In order to control the particle diameter distribution, the pulverization may be carried out twice or more times continuously, preferably three or more times continuously. In case of carrying out the pulverization twice or more times, a single pulverizer may be used or respective pulverizers may be used. Further, also a combination of different types of pulverizers may be used.

<Other Material Added to the Particulate Water Absorbent Resin>

A surface cross-linking agent, a liquid permeability improving agent, a lubricant, and the like may be added and mixed with the particulate water absorbent resin used in the method of the present invention for classification of particulate water absorbent resin during or after the polymerization. In case of adding and mixing the material after the polymerization, the material can be added and mixed before the drying or after the pulverization. Further, other material may be added to the particulate water absorbent resin used in the method of the present invention for classification of particulate water absorbent resin as long as the addition does not hamper the property of the water absorbent resin. A manner in which other material is added is not particularly limited.

(II) First Classification Step Using a First Screen and a Gravity

It is preferable to arrange the method of the present invention for classification of particulate water absorbent resin that particles whose particle diameter is less than 180 µm are classified from the particulate water absorbent resin in the first classification step using the first screen and a gravity. Further, in the method of the present invention for classification of particulate water absorbent resin, a mesh size of the first screen is preferably 150 µm or more and 300 µm or less. However, for convenience in description, the mesh size of the screen refers to a numerical value of a nominal mesh size described in a standard table concerning a JIS test (JIS Z 8801) screen which table is generally used. If the particle diameter deviates from this range, it may be impossible to obtain a desired particle diameter distribution. Further, it is preferable that the desired particle diameter is achieved with a classification efficiency of 90 weight % or more.

Herein, the first screen is a screen used in the first classification step. Further, examples of the classification using a screen and a gravity include: classification by a vibrating sieve (unbalance-weight driving type, resonance type, vibrating motor type, electromagnetic type, circular vibrating type, or the like); classification by an in-surface moving sieve (horizontal movement type, horizontal circular-linear movement type, three-dimensional movement type, and the like); and the like.

In a broad sense, the classification means an operation for classifying materials depending on a particle diameter, a shape, a chemical component, a color, density, radiation, magnetism, electrostatic property, and the like. In a narrow sense, the classification means an operation for classifying particles having the same density into two or more particle groups depending on a particle diameter.

The first classification step using the first screen and the gravity can be carried out by using a sieving device. The sieving device used in the present invention is not particularly limited as long as the sieving device has a screen. Examples thereof include a vibrating screen, a shifter, and the like. Examples of the vibrating screen include inclination-shaped ones, Low-head-shaped ones, Hummer, Rhewum, Ty-Rock, Gyrex, and elliptical vibration (Eliptex). Further, examples of the shifter include Reciprocating-shaped ones, Exolon-grader, Traversator-sieb, Sauer-meyer, Gyratory, gyro shifter, Ro-tex screen, and the like. These can be subdivided depending on (1) the motion form of a screen mesh face: circular, ellipse, straight line, circular arc, pseudo ellipse, and spiral; (2) the vibrating mode: free vibration and forced vibration; (3) the driving manner: eccentric axis, unbalance weight, electromagnet, and impact; (4) the inclination of a screen mesh face: horizontal type and inclined type; (5) the installation manner: floor type and pendant type. Above all, a sieving device, such as Tumbler-Screening machines available from Allgaier Co., in which its screen mesh face is spirally driven by a combination of radial inclination (the inclination of a screen mesh face to disperse materials from the center to the periphery) and tangential inclination (the inclination of a screen mesh face to control the discharge speed on meshes) is extremely available for classifying fine particles.

The sieving device is preferably used under such condition that the device is heated and/or such condition that the device is kept warm, and is preferably used at a temperature ranging from 30° C. to 100° C., or is preferably used at a temperature which is lower than a temperature of the particulate water absorbent resin so that a temperature difference therebetween is within 20° C. That is, in the sieving device, a temperature at a portion which is in contact with the particulate water absorbent resin, particularly, a temperature at a side wall of the screen mesh face is adjusted so as not cause agglomeration of the particulate water absorbent resin, thereby suppressing agglomeration of the particulate water absorbent resin. This makes it possible to effectively prevent clogging on the screen and to prevent drop in the classification efficiency and the classification ability. Further, it is possible to prevent such disadvantage that: the particulate water absorbent resin having passed through the screen mesh face adheres to an inner side wall of the sieving device, and constitutes a larger agglomerate, and vibration of the sieving device causes the agglomerate to drop off from the inner side wall, so that the agglomerate is incorporated into the product. Herein, not the screen but a side wall of a frame which fixes the screen is preferably heated and/or kept warm or in a similar manner, and a side wall of a frame which fixes a final classification screen is particularly preferably heated and/or kept warm or in a similar manner.

Herein, "heating" means to positively give heat. Thus, "such condition that the device is heated" means: (1) a condition under which heat is given to a sieving device in an initial state so as to increase the temperature up to a certain level and further heat is not given thereafter; (2) a condition under which heat is given to the sieving device not only in the initial state but also in a regular state. While, "kept warm" in the present invention means a condition under which heat is not given but the device is allowed to release less heat, that is, the temperature of the device is allowed to less drop. Thus, "such condition that the device is kept warm" means a condition under which heat is not given but a heat insulating material is wound around the device or a similar operation is carried out so that heat is hardly released. In the present invention, both "such condition that the device is heated" and "such condition that the device is kept warm" may be realized, for example, it may be so arranged that the heat insulating material is used while positively giving heat, or a similar arrangement may be adopted.

The sieving device is used preferably at a temperature ranging from 30 to 100° C., more preferably at a temperature ranging from 40 to 90° C. If the temperature is lower than 30° C., the effect of the present invention cannot be obtained.

The sieving device is used preferably at a temperature which is lower than the temperature of the particulate water absorbent resin so that the temperature difference therebetween is within 20° C. It is more preferable that the temperature difference is not smaller than 10° C. In treating the particulate water absorbent resin on an industrial scale, there is a case where the temperature of the particulate water absorbent resin is increased up to a temperature over a room temperature, preferably a temperature ranging from 40 to 100° C., more preferably a temperature ranging from 50 to 80° C., so as to secure the flowability. In case where the temperature of the sieving device is lower than the temperature of the particulate water absorbent resin so that the temperature difference is over 20° C., the heated particulate water absorbent resin is cooled by the sieving device, so that clogging may occur on the screen. Further, the particulate water absorbent resin may adhere to the inner side wall of the sieving device, and the adhering particulate water absorbent resin may constitute a larger agglomerate, and vibration of the sieving device may cause the agglomerate to drop off, so that the agglomerate may be incorporated into the product.

Note that, in the classification using the gravity and the screen, a differential pressure equal to or more than 10 mm $H_2O$ may be provided between an area where the particulate water absorbent resin has not passed through the screen and an area where the particulate water absorbent resin has passed through the screen so as to remove fine powder.

(III) Second Classification Step Using a Second Screen and an Aerial Current

In the method of the present invention for classification of particulate water absorbent resin, it is preferable that particles whose particle diameter is 106 μm or more are classified from the particles whose particle diameter is less than 180 μm in the second classification step using the second screen and an aerial current, and it is more preferable that particles whose particle diameter is 150 μm or more are classified from the particles whose particle diameter is less than 180 μm in the second classification step.

Further, in the method of the present invention for classification of particulate water absorbent resin, a mesh size of the second screen is 106 μm or more and 180 μm or less. If the mesh size deviates from these ranges, it may be impossible to obtain the desired particle diameter distribution. However, for convenience in description, the mesh size of the screen refers to a numerical value of a nominal mesh size described in a standard table concerning a JIS test (JIS Z 8801) screen which table is generally used. Thus, a wire diameter, a weaving manner, and the like may be altered in an arbitrary manner. Even if this results in slight variation of the actual mesh size, it does not matter. That is, it is important to adjust the difference between the mesh size of the first screen and the mesh size of the second screen, and it is preferable to arrange the method of the present invention for classification of particulate water absorbent resin so that a difference between the mesh size of the first screen and the mesh size of the second screen is 30 μm or more and 200 μm or less.

Herein, the second screen is a screen used in the second classification step. The aerial current moves the particulate water absorbent resin toward the second screen. Further, the aerial current allows particulate water absorbent resin passing through the second screen to be classified from particulate water absorbent resin which does not pass through the second screen. Note that, a direction of the aerial current is not particularly limited as long as the aerial current can move the particulate water absorbent resin toward the second screen. Further, examples of the aerial current include an airflow, a nitrogen gas flow, a flow of a mixture thereof, and the like. Each of these aerial currents is preferably used below a dew point. An amount of the aerial current is not particularly limited as long as the aerial current can move powder, and it is preferable to arbitrarily adjust the amount of the aerial current (so-called wind velocity) in accordance with a moving direction of powder, e.g., a gravity direction or a horizontal direction, or in accordance with a flow property of the powder.

The second classification step using the second screen and the aerial current is carried out preferably by using a pneumatic classifier, but it is possible to use also an oscillating sieve which utilizes the gravity and a screen as in Tumbler Shifter. In this case, an aerial current moving from an upper part of the screen to a lower part of the screen is formed, a nozzle arm capable of rotating is provided on the lower part of the screen, and air (so-called back wash air) is ejected from the nozzle arm, thereby washing the screen. The air may be intermittently or continuously ejected. Further, in washing the screen (screen), one or more kinds of rotation brush, scraper, and supersonic may be used in combination. The pneumatic classifier used in the present invention is not particularly limited as long as the pneumatic classifier has a screen. Examples thereof include High Bolter and the like. Further, it is possible to improve the classification efficiency by exerting supersonic vibration onto the screen mesh face of the pneumatic classifier arranged in this manner. In the pneumatic classifier, a temperature of a casing is preferably 30° C. or higher and 100° C. or lower. Particularly, it is preferable that the pneumatic classifier used in the second classification step using the second screen and the aerial current has a washing mechanism utilizing air (so-called back wash air) as a screen washing mechanism. As a result, even if the particulate water absorbent resin placed on the sieve is classified with it having slight viscosity due to moisture absorption or the like, it is possible to efficiently wash the screen.

Taking High Bolter as an example, the following will explain the pneumatic classifier usable in the second classification step using the second screen and the aerial current.

In the pneumatic classifier, an aerial current (airflow) into which powder (particulate water absorbent resin) has been incorporated passes through a fine powder separation device such as a screen, a casing, a cyclone, and the like. At this time, only air (gas) is discharged from an outlet of an adsorption blower provided on the downstream side of the fine powder separation device. That is, an aerial current (airflow) in which only fine powder (particulate water absorbent resin) out of powder (particulate water absorbent resin) has been incorporated passes through the screen and reaches the casing. Thereafter, fine powder (particulate water absorbent resin) having passed through the casing is collected by the fine powder separation device. Further, only air (gas) passes through the fine powder separation device and reaches the adsorption blower.

Herein, an air brush for a casing inner wall is provided in the casing, and a hollow tube which extends in a radius direction of its rotational axis is rotatably supported by the casing, and a slit having a minute width is provided on the hollow tube so as to be positioned on a surface opposite to the casing inner surface. Further, the aerial current (airflow) is ejected from the slit while rotating the hollow tube around the rotational axis.

Specifically, the aerial current in which only fine powder (particulate water absorbent resin) out of powder (particulate water absorbent resin) has been incorporated passes through the screen and reaches the casing. That is, powder other than the fine powder (particulate water absorbent resin) in the powder (particulate water absorbent resin) is classified by the screen. Thereafter, when the fine powder (particulate water absorbent resin) flowing in the aerial current (airflow) reaches the casing, the fine powder crashes the casing inner wall and the hollow tube at the surface of the casing. However, a surface area of the hollow tube is extremely narrow, and the surface of the hollow tube is curved, so that the aerial current (airflow) flows along the curved surface. Thus, even if the fine powder (particulate water absorbent resin) crushes the surface of the hollow tube, the fine powder does not adhere and remain thereon, so that the fine powder does not grow. Further, there is a case where the fine powder (particulate water absorbent resin) adheres to the casing inner wall. In this case, the rotational air brush provided in the casing blows the adhering fine powder (particulate water absorbent resin) from the casing inner wall quickly, and the brown fine powder is discharged from the outlet by the aerial current (airflow) in the casing. A mixture of the fine powder discharged from the outlet and air (gas) flows into the fine powder separation device such as a cyclone positioned downstream, and the fine powder (particulate water absorbent resin) is separated and collected. The aerial current (airflow) from which the fine powder (particulate water absorbent resin) has been separated passes through a dust catcher, an adsorption blower, and a sound absorber, and then is released to an atmosphere. An air brush consisting of a nozzle arm is provided on the back side of the screen, and the rotating nozzle arm ejects air to the screen, and clogging on the screen is cleaned by air. The air may be intermittently or continuously ejected. Further, in order to wash the screen, one or more kinds of a rotational brush, a scraper, and a supersonic may be used.

Thus, the fine powder (particulate water absorbent resin) does not adhere to and remain on the casing inner wall surface, so that the fine powder does not grow, which prevents powder (particulate water absorbent resin) whose particle diameter is larger than a predetermined particle diameter from being incorporated into the aerial current (airflow). Further, there is no problem in making such arrangement that the hollow tube constituting the air brush of the screen and the hollow tube constituting the casing inner wall surface air brush are constituted by a single hollow tube. Further, a flow velocity of an aerial current (airflow) blown to the screen does not have to be the same as a flow velocity of an aerial current (airflow) blown to the casing inner wall surface. It is rather preferable that the flow velocity of the aerial current (airflow) blown to the screen (screen) is made higher than the flow velocity of the aerial current (airflow) blown to the casing inner wall surface if the screen (screen) is fine. Further, in case where supply of the powder is based on free fall, it is preferable to use only the aerial current (reduced pressure) blown to the casing inner wall surface. Further, it is preferable that cleaning by the air brush for the screen is carried out more frequently than cleaning by the air brush for the casing inner wall surface.

Further, the sieving device of the present invention may include a granulation step in which larger particles or a particulate agglomerate are reproduced through granulation or the like from the particles having been removed by the classification so as to use the larger particles or the particulate agglomerate as particulate water absorbent resin. For example, it is possible to adopt: a method in which warm water and water absorbent resin fine powder are mixed and dried (U.S. Pat. No. 6,228,930); a method in which water absorbent resin fine powder is mixed with monomer aqueous solution so as to polymerize the mixture (U.S. Pat. No. 5,264,495); a method in which water is added to water absorbent resin fine powder and the mixture is subjected to granulation with a surface pressure equal to or more than a predetermined surface pressure (European Patent No. 844270); a method in which water absorbent resin fine powder is sufficiently swollen so as to form an amorphous gel, and the amorphous gel is dried and pulverized (U.S. Pat. No. 4,950,692); a method in which water absorbent resin fine powder and a polymerized gel are mixed with each other (U.S. Pat. No. 5,478,879); and a similar method. It is preferable to adopt the method in which warm water and water absorbent resin fine powder are mixed and dried. Further, the particulate water absorbent resin obtained in the granulation step may be used as the particulate water absorbent resin particles usable in the present invention without any modification or may be returned into the pulverization step and/or the classification step. In obtaining the desired particulate water absorbent resin particles, it is preferable to return the particulate water absorbent resin into the Pulverization step and/or the classification step. The particulate water absorbent resin reproduced in this manner substantially has a porous structure. A ratio of the particulate water absorbent resin collected by the reproduction based on the granulation step is preferably 5 to 30 weight %, more preferably 10 to 25 weight %. If the particulate water absorbent resin is produced only in the same production step, the ratio depends on an amount of particles removed by the classification. It is not preferable that the collect ratio increases since the higher collect ratio results in lower productivity and higher cost. Further, the particulate water absorbent resin reproduced by the granulation step has a larger surface area than that of particulate water absorbent resin produced not by the reproduction. This may result in advantage in view of capillary suction.

(IV) Particulate Water Absorbent Resin or the Like Obtained by the Method of the Present Invention for Classification of Particulate Water Absorbent Resin In the method of the present invention for classification of particulate water absorbent resin, there is classified the particulate water absorbent resin produced by using a line for continuously producing the particulate water absorbent resin so that a production amount is 500 kg/hr or more, more preferably 1000 kg/hr or more, particularly preferably 1500 kg/hr or more, for each line. That is, a larger production equipment raises more obvious problems in accordance with the conventional classification method. Thus, the present invention exhibits higher effects.

The particulate water absorbent resin obtained in accordance with the method of the present invention for classification of particulate water absorbent resin has the following characteristics and properties.

<Amount of Generated Dusts>

According to the method of the present invention for classification of particulate water absorbent resin, fine powder whose particle diameter is less than 150 μm and which has an unfavorable influence on the performance of the water absorbent resin can be efficiently classified. Besides, by carrying out the classification using a sieve and an aerial current, it is possible to more greatly reduce an amount of dusting fine particles which cannot be measured by the particle diameter distribution measurement using a sieve, e.g., fine particles whose particle diameter is less than 45

μm, particularly, ultra-fine particles whose particle diameter is less than 20 μm, further, particles whose particle diameter is less than 10 μm.

<Mass Average Particle Diameter (D50) and Particle Diameter Distribution (σζ) of Particulate Water Absorbent Resin>

As described in U.S. Pat. No. 5,051,259, the mass average particle diameter (D50) is a particle diameter of a standard sieve which has a certain mesh size and corresponds to 50 weight % of the entire particles.

The particulate water absorbent resin obtained by the method of the present invention for classification of particulate water absorbent resin is prepared by granulation with inorganic powder, hydrophilic organic solvent, or the like, as necessary. Thus, with respect to a mass of the particulate water absorbent resin, preferably 90 weight % (upper limit is 100%) or more of particles whose particle diameter is not less than 150 μm and less than 850 μm, more preferably 95 weight % or more of particles whose particle diameter is not less than 150 μm and less than 850 μm, further more preferably 98 weight % or more of particles whose particle diameter is not less than 150 μm and less than 850 μm, are included in the particulate water absorbent resin.

The particle diameter of the particulate water absorbent resin may be adjusted by adding/mixing insoluble particles or hydrophilic solvent, preferably water, and by further carrying out granulation, in accordance with the object and necessity. The adjustment of the particle diameter may be carried out by carrying out dispersion polymerization and dispersion drying in a form of particles as in the reversed phase suspension polymerization. In case of the aqueous solution polymerization or the like, it is general that the pulverization and the classification are carried out after the drying and fine powder is recycled by granulation or the like as necessary, thereby adjusting the particle diameter to a specific particle diameter.

(V) Absorbent Core and/or Absorbing Article

The particulate water absorbent resin obtained by the method of the present invention for classification of particulate water absorbent resin is used for the purpose of use in absorbing water and is widely used as an absorbent core and an absorbing article. Particularly, the particulate water absorbent resin is used as a sanitary material for absorbing body fluid such as urine, blood, and the like.

Specifically, a surface cross-linking agent is added to the particulate water absorbent resin obtained by the method of the present invention for classification of particulate water absorbent resin so as to carry out a surface cross-linking treatment, and then other materials such as a liquid permeability improving agent, a surfactant, a lubricant, and the like are added, thereby producing the particulate water absorbent resin. Further, the particulate water absorbent resin is used to produce an absorbent core and an absorbing article. Note that, how to add other materials is not particularly limited.

Herein, the absorbent core is an absorbing agent which is molded by using a particulate water absorbing agent and hydrophilic fiber. The absorbent core is produced by molding the particulate water absorbing agent and the hydrophilic fiber into a film manner, a tube manner, or a sheet manner for example. In the absorbent core, an amount of the particulate water absorbing agent (core concentration) with respect to a total amount of the particulate water absorbing agent and the hydrophilic fiber is preferably 20 to 100 weight %, more preferably 30 to 100 weight %, still more preferably 40 to 100 weight %. In the absorbent core, as the core concentration of the particulate water absorbing agent is higher, the particulate water absorbing agent exhibits lower absorbent property effect at the time of production of the absorbent core, a disposable diaper, and the like. Further, it is preferable that the absorbent core is thin, e.g., 0.1 to 5 mm.

The absorbing article includes the absorbent core, a liquid permeable front sheet, and a liquid impermeable back sheet. In producing the absorbing article, first, for example, a fiber material and the particulate water absorbing agent are blended or sandwiched so as to produce the absorbent core. Next, the absorbent core is sandwiched by the liquid permeable front sheet and the liquid impermeable back sheet and is equipped with an elastic member, a diffusion layer, an adhesive tape, and the like for example, so that the product is used as an absorbing article, particularly, an adult incontinence pad and a sanitary napkin. The absorbent core is compression-molded to a density of 0.06 g/cc or more and 0.50 g/cc or less and a basic weight of 0.01 g/cm$^2$ or more and 0.20 g/cm$^2$ or less. Note that, the fiber material used is, for example, crushed wood pulp or a hydrophilic fiber such as a cotton linter, a cross-linked cellulose fiber, rayon, cotton, wool, acetate, or vinylon. These fiber materials are preferably aerated.

The absorbing article exhibits excellent absorbent property. Specific examples of the absorbing article include sanitary materials such as: an adult diaper which has been greatly improved recently; a child diaper; a sanitary napkin, a so-called incontinence pad; and the like. However, the absorbing article is not limited to these materials. The excellent absorbent property of the particulate water absorbent resin existing in the absorbing article realizes a smaller re-wet amount, highly dry feeling, and less burden exerted to the absorbing article user and a care giver.

(VI) Others

In this way, the method according to the present invention for classification of particulate water absorbent resin is not particularly limited to any specific arrangement as long as: for example, particles (fine powder) having a particle diameter less than a desired particle diameter are classified from the particulate water absorbent resin by classification using a gravity and a sieve so that its classification efficiency is 70 weight % or more, more preferably 80 weight % or more, most preferably 90 weight % or more, and then particles having a particle diameter equal to or more than a desired particle are classified from those classified particles by using a pneumatic classifier having a screen.

EXAMPLES

The following Examples and Comparative Examples will more specifically explain the present invention, but the present invention is not limited to them.

[Polymerization, Drying, and Pulverization Steps of Particulate Water Absorbent Resin]

A monomer aqueous solution which was made of sodium acrylate, acrylic acid, and water and whose monomer concentration was 38 weight % and neutralization ratio was 70 mol % was prepared in a kneader equipped with two sigma blades. Further, polyethyleneglycoldiacrylate (the number of average ethyleneglycol units was 9) serving as an internal cross-linking agent was dissolved so that its molar amount was 0.03 mol % with respect to the monomer.

Next, nitrogen gas was injected into the monomer aqueous solution so as to reduce dissolved oxygen and the inside of the kneader is entirely subjected to nitrogen substitution. Subsequently, sodium persulfate serving as a polymerization initiator was added so that its amount was 0.12 g/mol with respect to the monomer while rotating two sigma blades. Further, L-ascorbic acid was added so that its amount was 0.005 g/mol with respect to the monomer. Further, the resultant was polymerized while being stirred in the kneader, thereby obtaining a hydrophilic cross-linked polymer whose average particle diameter was 2 mm 40 minutes later.

The resultant hydrophilic cross-linked polymer was dried by a hot air dryer at 170° C. for 60 minutes. Further, the dried hydrophilic cross-linked polymer was pulverized by a roll mill pulverizer, thereby obtaining pulverized particles to be classified.

[Classification Step of Particulate Water Absorbent Resin]

The classification step of the particulate water absorbent resin was carried out as in Embodiment 1 and Comparative Examples 1 and 2.

Example 1

<First Classification Step of Particulate Water Absorbent Resin>

The resultant pulverized particles to be classified were classified by using a sieving device in which a screen having a mesh size of 850 μm and a screen having a mesh size of 180 μm are stacked (product name: Tumbler Shifter TSM-1600, product of Algaier Co.) so that a supply amount thereof was 800 kg/hr. Further, particulate water absorbent resin (A) which had passed through the screen having the mesh size of 850 μm and had not passed through the screen having the mesh size of 180 μm and particulate water absorbent resin (B) which had passed through the screen having the mesh size of 180 μm were classified. At this time, as to a ratio between the particulate water absorbent resin (A) and the particulate water absorbent resin (B), the particulate water absorbent resin (A) was 80 weight % and the particulate water absorbent resin (B) was 20 weight %. Further, as to the particulate water absorbent resin (B), its water content was 5%, its weight average particle diameter was 105 μm, and a ratio of its fine powder whose particle diameter was less than 106 μm was 50.5%. Herein, measurement conditions in the sieving device are shown in Table 2.

<Second Classification Step of Particulate Water Absorbent Resin>

The particulate water absorbent resin (B) whose temperature was about 40° C. was classified by using a pneumatic classifier including a screen having a mesh size of 106 μm (product name: High Bolter MR-300S, product of TOYO HITEC CO., LTD.) so that a supply amount thereof was 113 kg/hr. Further, fine powder whose particle diameter was less than 106 μm was removed, thereby classifying particulate water absorbent resin (C) which had not passed through the screen having the mesh size of 106 μm. At this time, a ratio of the particulate water absorbent resin (C) was 53.8 weight % and a ratio of the removed fine powder was 46.2 weight %. Herein, measurement conditions in the pneumatic classifier are shown in Table 2.

Subsequently, the particulate water absorbent resin (A) and the particulate water absorbent resin (C) were blended at a ratio of 8:2, thereby obtaining particulate water absorbent resin (D) to be subjected to a heat treatment. Note that, in Example 1, no clogging was found in the screen during the classification operation carried out for 8 hours.

Further, ratios of residual particles of the resultant particulate water absorbent resins (A) to (D) on the screen and ratios of particles of the particulate water absorbent resins (A) to (D) which passed through the screen are shown in Table 1.

Example 2

<First Classification Step of Particulate Water Absorbent Resin>

The resultant pulverized particles to be classified were classified by using a sieving device in which a screen having a mesh size of 850 μm and a screen having a mesh size of 300 μm are stacked (product name: Tumbler Shifter TSM-1600, product of Algaier Co.) so that a supply amount thereof was 800 kg/hr. Further, particulate water absorbent resin (E) which had passed through the screen having the mesh size of 850 μm and had not passed through the screen having the mesh size of 300 μm and particulate water absorbent resin (F) which had passed through the screen having the mesh size of 300 μm were classified. At this time, a ratio of the particulate water absorbent resin (E) was 70 weight % and a ratio of the particulate water absorbent resin (F) was 30 weight %. Further, as to the particulate water absorbent resin (F), its water content was 5%, its weight average particle diameter was 140 μm, and a ratio of its fine powder whose particle diameter was less than 150 μm was 53.3%. Herein, measurement conditions in the sieving device are shown in Table 4.

<Second Classification Step of Particulate Water Absorbent Resin>

The particulate water absorbent resin (F) whose temperature was about 40° C. was classified by using a pneumatic classifier including a screen having a mesh size of 150 μm (product name: High Bolter MR-300S, product of TOYO HITEC Co., LTD.) so that a supply amount thereof was 113 kg/hr. Further, fine powder whose particle diameter was less than 150 μm was removed, thereby classifying particulate water absorbent resin (G) which had not passed through the screen having the mesh size of 150 μm. At this time, a ratio of the particulate water absorbent resin (G) was 48.5 weight % and a ratio of the removed fine powder was 51.5 weight %. Herein, measurement conditions in the pneumatic classifier are shown in Table 4.

Subsequently, the particulate water absorbent resin (E) and the particulate water absorbent resin (G) were blended at a ratio of 7:3, thereby obtaining particulate water absorbent resin (H) to be subjected to a heat treatment.

Further, ratios of residual particles of the resultant particulate water absorbent resins (E) to (H) on the screen and ratios of particles of the particulate water absorbent resins (E) to (H) which passed through the screen are shown in Table 3.

Comparative Example 1

The resultant pulverized particles to be classified were classified by using a sieving device including a screen having a mesh size of 850 μm so that a supply amount thereof was 800 kg/hr. In this manner, comparative particulate water absorbent resin (1) to be heat-treated was obtained.

Further, a ratio of residual particles of the resultant pulverized particles (1) to be classified which residual particles remained on the screen and a ratio of particles of the pulverized particles (1) to be classified which particles passed through the screen are shown in Table 1.

Comparative Example 2

The resultant pulverized particles to be classified were classified by using a sieving device in which a screen having a mesh size of 850 μm and a screen having a mesh size of 106 μm are overlapped so that a supply amount thereof was 800 kg/hr. However, the screen was broken one hour later, so that the particulate water absorbent resin to be heat-treated was not obtained.

Table 1 shows evaluation results concerning ratios of residual particles of the particulate water absorbent resins of Example 1 and Comparative Examples 1 and 2 which residual particles remained on the screen and ratios of particles of the particulate water absorbent resin which particles passed through the screen.

TABLE 1

| Resultant particulate water absorbent resin | | Example 1 | | | | Comparative Example 1 | Comparative Example 2 |
|---|---|---|---|---|---|---|---|
| | | Particulate water absorbent resin (A) | Particulate water absorbent resin (B) | Particulate water absorbent resin (C) | Particulate water absorbent resin (D) | Particulate water absorbent resin (1) | Failed to obtain |
| Particle diameter and ratio (weight %) | ON 850 μm | 0.0 | — | — | 0.0 | 0.0 | — |
| | ON 600 μm | 31.0 | — | — | 27.7 | 25.2 | — |
| | ON 300 μm | 54.0 | 0.0 | 0.0 | 47.3 | 43.0 | — |
| | ON 180 μm | 14.0 | — | — | — | — | — |
| | ON 150 μm | 0.3 | 19.6 | 35.9 | 16.6 | 15.0 | — |
| | ON 106 μm | 0.3 | 29.4 | 56.8 | 7.0 | 6.2 | — |
| | PASS 106 μm | 0.4 | 51.0 | 7.3 | 1.4 | 10.6 | — |

As shown in Table 1, comparison between Example 1 and Comparative Example 1 shows such result that the particulate water absorbent resin (D) of Example 1 passed through the screen having a mesh size of 106 μm unlike the particulate water absorbent resin (1) of Comparative Example 1, that is, a ratio of its fine powder is smaller than that of the particulate water absorbent resin (1) of Comparative Example 1. That is, it is apparent that: if the first classification step using the first screen and a gravity and the second classification step using the second screen and an aerial current are carried out and the particulate water absorbent resin having been classified in the first classification step is further classified in the second classification step, particulate water absorbent resin having a desired particle diameter range can be efficiently obtained.

Further, Table 2 shows measurement conditions in the sieving device and the pneumatic classifier in Example 1 and Comparative Examples 1 and 2.

TABLE 2

| | Sieving device | Pneumatic classifier |
|---|---|---|
| Product name | Tumbler Shifter TSM-1600 | High Bolter MR-300S |
| Screen diameter (mm) | — | Φ298 |
| Mesh size of screen (μm) | 180 | 106 |
| Process airflow (m³/min) | — | 5.4 |
| Screen differential pressure (free from load) (kPa) | — | 0.8 |
| Screen differential pressure (under load) (kPa) | — | 1.3 |
| Retention time on screen (second) | 54 | <5 |

Table 3 shows evaluation result concerning a ratio of residual particles of the particulate water absorbent resin on the screen in Example 2 and a ratio of particles of the particulate water absorbent resin which passed through the screen.

Further, Table 4 shows measurement conditions in the sieving device and the pneumatic classifier in Example 2.

TABLE 4

| | Sieving device | Pneumatic classifier |
|---|---|---|
| Product name | Tumbler Shifter TSM-1600 | High Bolter MR-300S |
| Screen diameter (mm) | Φ1580 | Φ298 |
| Mesh size of screen (μm) | 300 | 150 |
| Process airflow (m³/min) | — | 5.4 |
| Screen differential pressure (free from load) (kPa) | — | 0.8 |
| Screen differential pressure (under load) (kPa) | — | 1.3 |
| Retention time on screen (second) | <40 | <5 |

As described above, the method of the present invention for classification of particulate water absorbent resin is a method for classification of particulate water absorbent resin obtained by polymerizing an unsaturated monomer so as to form a cross-linked polymer hydrogel and drying and pulverizing the cross-linked polymer hydrogel, said method comprising plural classification steps different from each other so as to remove fine powder.

Therefore, the method of the present invention for classification of particulate water absorbent resin allows particulate water absorbent resin having a desired particle diameter range to be efficiently obtained at low cost while securing the high productivity even in case where a larger production equipment is used.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

TABLE 3

| Resultant particulate water absorbent resin | | Example 2 | | | |
|---|---|---|---|---|---|
| | | Particulate water absorbent resin (E) | Particulate water absorbent resin (F) | Particulate water absorbent resin (G) | Particulate water absorbent resin (H) |
| Particle diameter and ratio (weight %) | ON 850 μm | 0.0 | — | — | 0.0 |
| | ON 600 μm | 35.8 | — | — | 25.0 |
| | ON 300 μm | 62.3 | 0.0 | — | 43.6 |
| | ON 150 μm | 1.4 | 46.8 | 96.6 | 29.9 |
| | ON 106 μm | 0.4 | 19.0 | 1.1 | 0.6 |
| | PASS 106 μm | 0.0 | 34.3 | 2.3 | 0.7 |

* For example, "ON 850 μm" shows a ratio of particulate water absorbent resin remaining on a screen whose mesh size is 850 μm. Further, "PASS 106 μm" shows a ratio of particulate water absorbent resin passing through a screen whose mesh size is 106 μm.

INDUSTRIAL APPLICABILITY

As described above, the method of the present invention for classification of particulate water absorbent resin is to classify particulate water absorbent resin without lowering effects such as absorbent property and the like. Thus, the particulate water absorbent resin obtained by the method of the present invention for classification of particulate water absorbent resin exhibits excellent absorbent property and the like. Such particulate water absorbent resin can be widely used, for example, as (i) sanitary material absorbing agents such as adult disposable diapers, child diapers, sanitary napkins, so-called incontinence pads, which have been greatly improved recently; (ii) water-soluble polymer favorably used as flocculating agents, coagulants, soil improving agents, soil stabilization agents, viscosity improving agents, and the like; or (iii) soil water retaining agents, dehydrating agents, and the like, in an agricultural/horticultural field and a civil engineering field.

The invention claimed is:

1. A method for classification of particulate water absorbent resin obtained by polymerizing an unsaturated monomer so as to form a cross-linked polymer hydrogel and drying and pulverizing the cross-linked polymer hydrogel, said method comprising:
    a first classification step in which a first screen and a gravity are used; and
    a second classification step in which a second screen device and an aerial current are used,
    the first classification step and the second classification step being carried out continuously,
    the first and the second classification steps being different from each other so as to remove fine powder,
    the first classification step being carried out by using a sieving device at a temperature ranging from 30° C. to 100° C., and
    the particulate water absorbent resin, having been classified by the first classification step and having passed through the first screen, being further classified by the second classification step and passing through the second screen so as to remove fine powder,
    whereby an amount of particulate water absorbent resin classified in second classification step is smaller than that in the first classification step; and
    wherein the sieving device used in the first classification step and the second screen device used in the second classification step differ from each other
    wherein a mesh size of the first screen is 150 μm or more and 300 μm or less, and
    wherein a mesh size of the second screen is 106 μm or more and 180 μm or less
    the sieving device is used at a temperature which is lower than a temperature of the particulate water absorbent resin so that the temperature difference therebetween is within 20° C. and
    wherein, in the first classification step, a differential pressure equal to or more than 10 mm $H_2O$ is provided between an area where the particulate water absorbent resin has not passed through the screen and an area where the particulate water absorbent resin has passed through the screen so as to remove fine powder.

2. The method as set forth in claim 1, wherein the plural classification steps are applied to a line for continuously producing particulate water absorbent resin so that a production amount is 500 kg/hr or more for each line.

3. The method as set forth in claim 1, wherein a pneumatic classifier having the second screen is used in the second classification step.

4. The method as set forth in claim 1, wherein a difference between the mesh size of the first screen and the mesh size of the second screen is 30 μm or more and 200 μm or less.

5. The method as set forth in claim 1, wherein particles whose particle diameter is less than 180 μm are classified from the particulate water absorbent resin in the first classification step, and particles whose particle diameter is 106 μm or more are classified from the particles whose particle diameter is less than 180 μm in the second classification step.

6. The method as set forth in claim 1, wherein particles whose particle diameter is less than 180 μm are classified from the particulate water absorbent resin in the first classification step, and particles whose particle diameter is 150 μm or more are classified from the particles whose particle diameter is less than 180 μm in the second classification step.

* * * * *